United States Patent [19]

Hayman

[11] Patent Number: 4,606,372

[45] Date of Patent: Aug. 19, 1986

[54] FAUCET VALVE BONNET LOCKING MEANS

[75] Inventor: Dennis J. Hayman, Plano, Tex.

[73] Assignee: United States Brass Corporation, Plano, Tex.

[21] Appl. No.: 738,829

[22] Filed: May 29, 1985

[51] Int. Cl.[4] .......................................... F16K 11/065
[52] U.S. Cl. ................... 137/315; 137/454.6; 137/625.17; 137/625.4; 137/636.3
[58] Field of Search ............ 137/625.17, 625.4, 636.2, 137/636.3, 636.4, 454.6, 315

[56] References Cited

U.S. PATENT DOCUMENTS

| 3,526,250 | 9/1970 | Miller | 137/625.4 |
| 3,680,592 | 8/1972 | Hayman | 137/625.4 |
| 3,698,418 | 10/1972 | Schmitt | 137/636.3 |
| 3,747,638 | 7/1973 | Manoogian et al. | 137/625.4 |
| 3,882,897 | 5/1975 | Manoogian et al. | 137/625.4 |
| 4,226,260 | 10/1980 | Schmitt | 137/625.17 |
| 4,502,507 | 3/1985 | Hayman | 137/625.4 |

Primary Examiner—G. L. Walton
Attorney, Agent, or Firm—Wm. T. Wofford; James C. Fails; Arthur F. Zobal

[57] ABSTRACT

Improved faucet valve bonnet locking arrangement locks the valve control assembly to the valve body and utilizes a bonnet locking ring to lock the valve control assembly to the bonnet and consequently bonnet rotational movement relative to the valve body is prevented. In addition, the bonnet locking ring interengages the valve control assembly and the bonnet in a manner such that locking of the bonnet relative to the valve body may be accomplished regardless of the assembled rotational position of the bonnet relative to the valve body.

5 Claims, 6 Drawing Figures

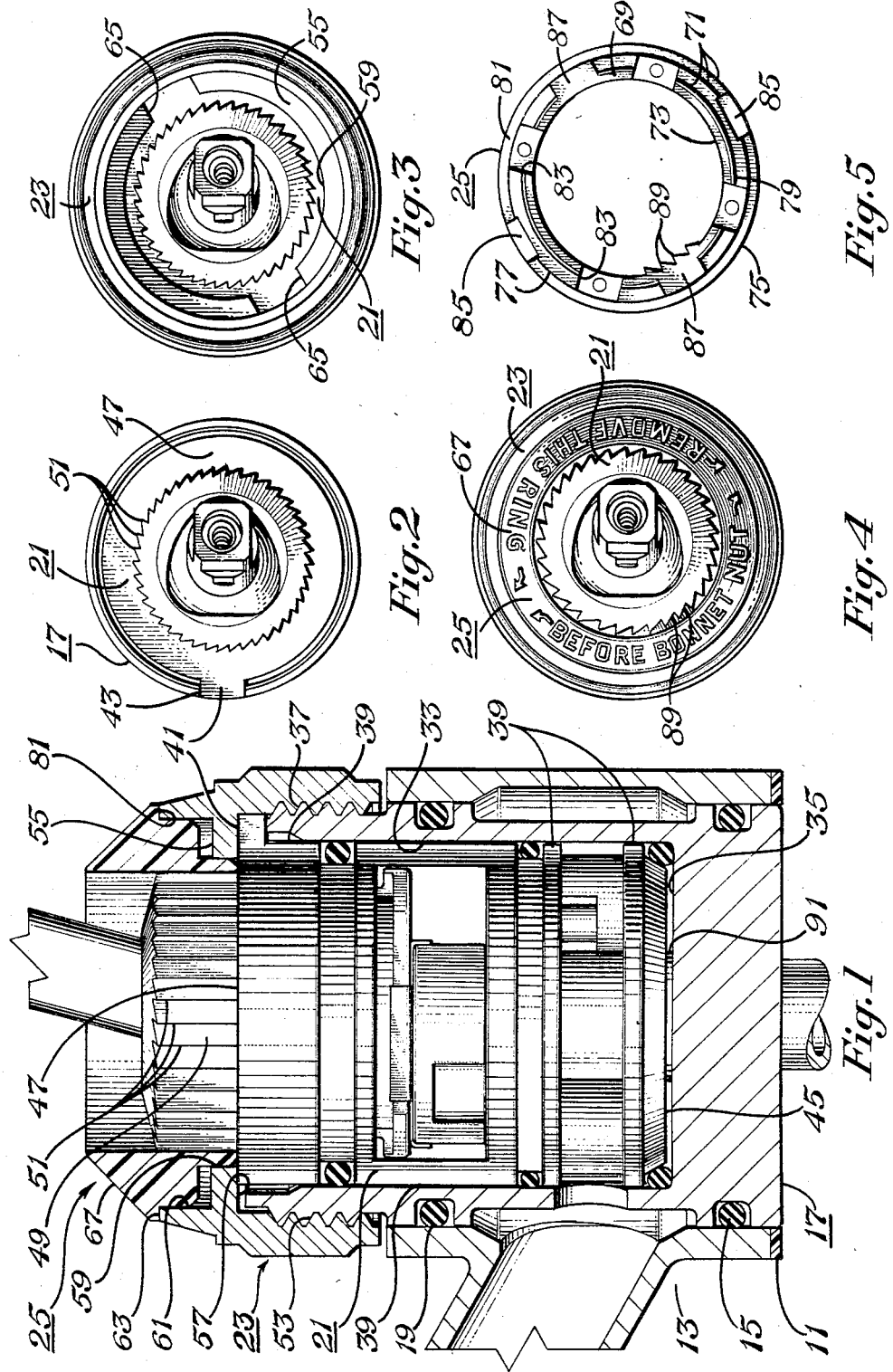

FAUCET VALVE BONNET LOCKING MEANS

FIELD OF INVENTION

The invention relates to faucet valves of the type used for kitchen sinks, lavatories, bathtubs, showers, and the like.

BACKGROUND OF THE INVENTION

Faucet valves in the prior art have commonly utilized a bonnet to hold an assembly of faucet valve parts in place within a valve body. The bonnet normally has internal threads that mate with external threads on the valve body, and in assembly, the bonnet is threaded onto the valve body. In some cases it is desirable to provide bonnet locking means to prevent rotational movement of the bonnet after assembly. Bonnet locking means of the prior art have not proved to be entirely satisfactory, suitable, or adequate, for certain applications; particularly, those applications wherein the rotational position of the bonnet relative to the valve body upon assembly is not fixed. It is accordingly the objective of this invention to provide improved faucet valve bonnet locking means that are suitable and effective regardless of the rotational position of the bonnet relative to the valve body upon assembly.

SUMMARY OF THE INVENTION

The present invention provides improved faucet valve locking means. The invention pertains to faucet valves of types wherein there is a valve body means, an assembly of faucet valve internal parts (which may be commonly referred to as a valve control assembly), and a bonnet. The valve body means will define a chamber having a generally cylindrical side wall, a bottom end wall and an open top, with the valve body means having external threads adjacent the open top. The assembly of faucet valve parts (valve control assembly) will have cylindrical exterior surfaces that can be matingly received by the valve body means cylindrical side wall and will have a top bearing surface. The bonnet will have internal threads that are adapted for engaging the valve body means external threads. The valve control assembly will be disposed within the valve body means chamber and the bonnet will be threaded onto the valve body means and will retain the valve control assembly within the valve body means chamber.

The bonnet locking means to be provided will prevent rotational movement of the bonnet relative to the valve body means. In its broadest aspect, the present invention provides means for preventing rotational movement of the valve control assembly relative to the valve body means, and means interengaging the valve control assembly and the bonnet for preventing rotational movement of the bonnet relative to the valve control assembly and consequently preventing rotational movement of the bonnet relative to the valve body means.

In accordance with another aspect of the invention, bonnet locking means to be provided will be suitable and effective regardless of the rotational position of the bonnet relative to the valve body means upon assembly. In valve control assemblies of a type involving a "stack" of valve parts which have manufacturing tolerances, the overall length of the valve control assembly will be variable in a random fashion, and in order to make certain that the valve control assembly will always be clamped by the bonnet with the force required to assure proper seating of the valve control assembly inlet seals, the overall length of the valve control assembly must be such that the installed assembly length between the valve body means bottom end wall and the valve control assembly top bearing surface will always be at least equal to the length of the valve body means chamber side wall. Under the conditions just described, since the overall length of the valve control assembly will be variable in a random fashion, so also the rotational position of the bonnet upon assembly will be variable in a random fashion. A bonnet locking ring is provided that has radially outer and inner peripheral surfaces, with at least a portion of the outer peripheral surface engaging the bonnet and at least a portion of the inner peripheral surface engaging the valve control assembly. Further, the valve control assembly may be provided a generally cylindrical locking portion having diameter less than that of the above mentioned valve control assembly cylindrical exterior surfaces and extending outwardly beyond the valve control assembly top bearing surface, with the peripheral surface of the locking portion having longitudinally extending slots. The bonnet will have an internal flange portion which has a bearing surface that is adapted for engaging the valve control assembly top bearing surface. The bonnet internal flange portion will be provided at least a slot, which is preferably rectangular. A portion of the locking ring outer peripheral surface will form a protrusion that is preferably rectangular and is to be received by the bonnet slot. At least a portion of the locking ring inner peripheral surface will form a plurality of protrusions that are adapted to be received by the valve control assembly locking portion longitudinally extending slots. The bonnet slot is made sufficiently wider than the locking ring rectangular protrusion that the locking ring inner peripheral surface protrusions will always be engagable with the valve control assembly locking portion longitudinally extending slots, regardless of the assembled rotational position of the bonnet relative to the valve body means. The valve control assembly locking portion longitudinally extending slots will of course cover the locking portion circumference to an extent sufficient to accomodate the maximum variation of bonnet rotational position upon assembly. The locking ring inner peripheral surface protrusions and the valve control assembly locking portion longitudinally extending slots are preferably ratchet type teeth.

BRIEF DESCRIPTION OF DRAWINGS

FIG. 1 is a longitudinal section view showing the entire assembly for a faucet valve incorporating improved bonnet locking means in accordance with a preferred embodiment of the invention.

FIG. 2 is a plan view of the faucet valve of FIG. 1 before installation of the bonnet and the bonnet locking ring.

FIG. 3 is a plan view of the faucet valve of FIG. 1 after installation of the bonnet but before installation of the bonnet locking ring.

FIG. 4 is a plan view of the faucet valve of FIG. 1 after installation of the bonnet and the bonnet locking ring.

FIG. 5 is a plan view of the bonnet locking ring as viewed from the lower side.

DESCRIPTION OF PREFERRED EMBODIMENTS

Figure 6:
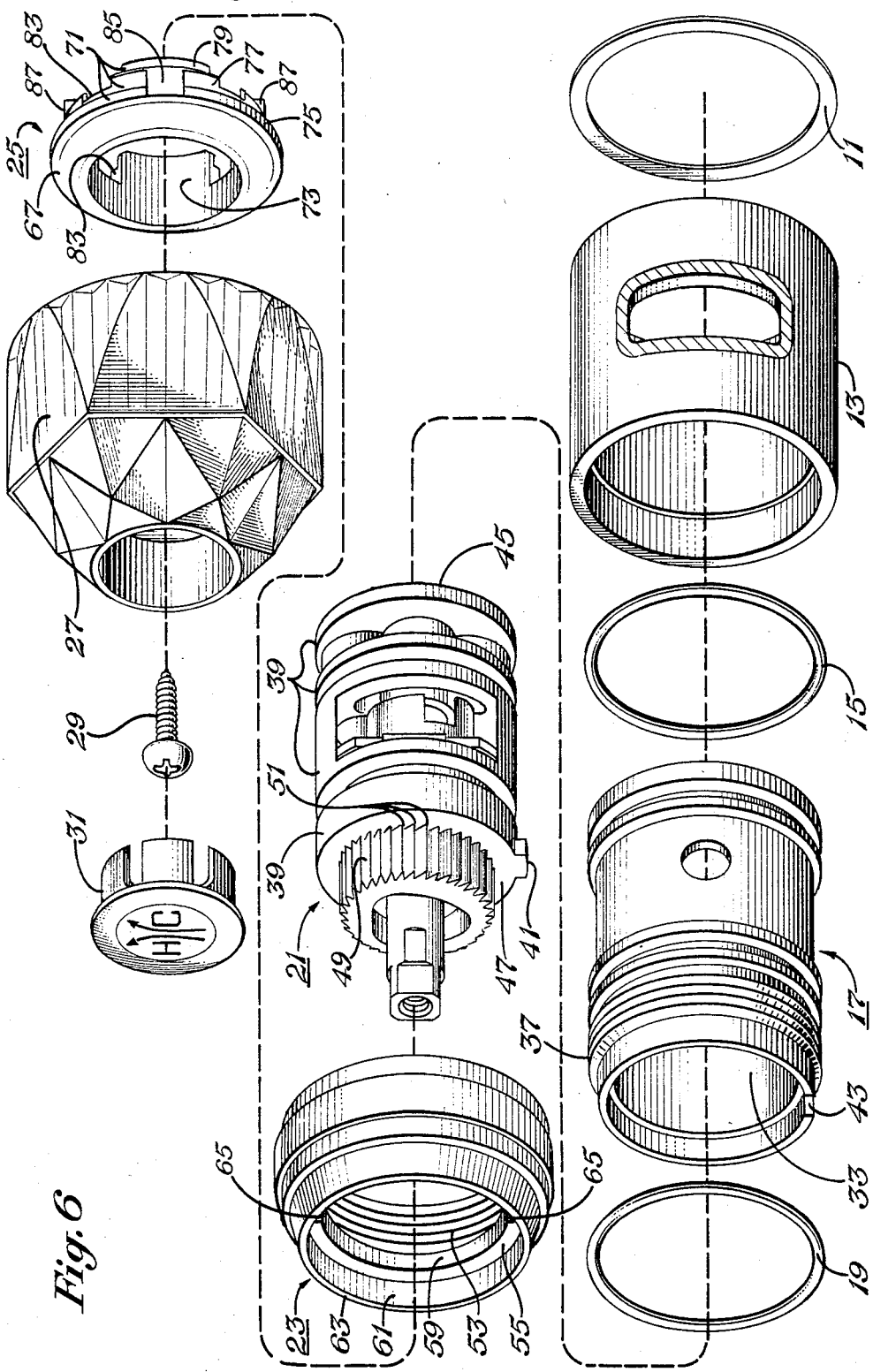
FIG. 6 is an exploded perspective view showing the various parts of the faucet valve of FIG. 1.

In the preferred embodiment herein described and shown in the drawings, the invention is utilized in a single handle faucet valve. The parts of the single handle faucet valve are best shown by the exploded view of FIG. 6, where from the lower right to upper left they are spout member hub bearing ring 11, spout member hub 13, o-ring 15, valve body means 17, o-ring 19, valve control assembly 21 (sometimes referred to herein as assembly of faucet valve parts), bonnet 23, bonnet locking ring 25, handle 27, handle retainer screw 29 and handle cap member 31.

U.S. Pat. No. 4,502,507, which is owned by the Assignee of the present invention, shows and describes a single lever faucet valve which is essentially identical to the one shown and described herein except that it does not embody the improved bonnet locking means of the present invention. The disclosure of U.S. Pat. No. 4,502,507 is incorporated by reference into this disclosure. Consequently, the single handle faucet valve parts will be described herein only to the extent that the description has particular relevance to the improved bonnet locking means of the present invention.

The valve body means 17 defines a chamber having a generally cylindrical side wall 33, a bottom end wall 35 and an open top, and the valve body means is provided external threads 37 adjacent the open top.

The valve control assembly 21 (assembly of faucet parts) is disposed within the chamber and has cylindrical exterior surfaces 39 that are matingly received by the side wall 33. The valve control assembly 21 is shown in FIGS. 1 and 6 as a unitary assembly. The parts that make up this assembly are shown and described by U.S. Pat. No. 4,502,507 hereinabove mentioned, except that the upper or outer end portion of the retainer member 13 is modified for the purposes of the present invention, as will be hereinafter described.

The cylindrical exterior surface 39 of the valve control assembly 21 has at its upper or outer end portion a rectangular protrusion 41 which upon assembly is matingly received by a rectangular slot 43 located on the upper or outer end of the valve body means 17. The valve control assembly 21 has a bottom surface 45 and a top bearing surface 47. The top bearing surface 47 merges at its radially outward periphery with the outer margin of the upper cylindrical exterior surface 39, and at its radially inward periphery with the longitudinal inner end of a generally cylindrical locking portion 49. The locking portion 49 of course has a diameter less than that of the cylindrical exterior surfaces 39 and extends longitudinally outwardly beyond the top bearing surface 47. The peripheral surface of the locking portion 49 is provided with longitudinally extending slots 51 in the form of ratchet type teeth.

The bonnet 23 is generally cylindrical and is provided internal threads 53 that matingly engage the external threads 37 of the valve body means 17 upon assembly. Longitudinally outwardly of the internal threads 53 there is provided a radially inwardly extending internal flange portion 55 having a radially extending bearing surface 57 and a longitudinally extending cylindrical locking ring retainer surface 59. The bonnet 23 also has an internal longitudinally extending cylindrical end portion surface 61 that merges at one end with said internal flange 55 and at the other end with an outer extremity radially extending face surface 63. The bonnet internal flange 55 is provided diametrically opposed slots 65 for a purpose to be hereinafter described.

The bonnet locking ring 25 has a top surface 67, a bottom surface 69, a radially outward peripheral surface 71 and a radially inward peripheral surface 73. The radially outward peripheral surface 71 includes longitudinally extending outer 75, intermediate 77 and inner 79 cylindrical surfaces. The intermediate cylindrical surface 77 is of lesser diameter than the outer cylindrical surface 75 so as to form a bonnet flange portion 81. The inner cylindrical surface 79 is of lesser diameter than the intermediate cylindrical surface 77. Longitudinally extending rectangular slots 83 are formed at 90° intervals in the inner cylindrical surface 79 and extend partially into the intermediate cylindrical surface 77. The inner cylindrical surfaces 79 between the slots 83 function as locking ring retaining surfaces. Diametrically opposed rectangular depressions 85 are formed in the intermediate cylindrical surface 77 and the outer cylindrical surface 75 for a purpose to be hereinafter described. Diametrically opposed rectangular protrusions 87 displaced 90° from said rectangular depressions 85 extend radially outwardly from said inner cylindrical surface 79, with their outward surface being flush with said intermediate cylindrical surface 77. The rectangular protrusions 87 are for a purpose to be hereinafter described. The locking ring inner peripheral surface 73 is provided a plurality of longitudinally extending protrusions 89 which are ratchet type teeth adapted for matingly engaging the longitudinally extending slots 51 on the locking portion 49 of the valve control assembly 21.

The complete assembly of a single lever faucet valve embodying the present invention is shown by FIG. 1. This assembly will now be described, with particular attention to the improved bonnet locking means of the present invention. As hereinabove mentioned, the valve control assembly 21 as shown in FIGS. 1 and 6 is a unitary assembly. For a description of the manner of its assembly, reference is made to U.S. Pat. No. 4,502,507. Also, for a description of the manner of assembly of the spout member hub 13 and its associated parts, reference is made to U.S. Pat. No. 4,502,507.

The valve control assembly 21 is inserted into the chamber of the valve body means 17 with the valve control assembly rectangular protrusion 41 being received by the valve body means rectangular slot 43, so as to prevent rotational movement of the valve control assembly 21 relative to the valve body means 17. Next, the bonnet 23 is threaded onto the valve body member 17 so that the valve control assembly top bearing surface 47 is engaged by the bonnet internal flange portion bearing surface 57, and the requisite clamping force is applied to assure proper seating of the valve control assembly inlet seals 91. Then, the bonnet locking ring 25 is placed on the bonnet 23 with the locking ring rectangular protrusions 87 being received by the bonnet internal flange portion slots 65, and the locking ring longitudinally extending protrusions 89 being received by the valve control assembly locking portion longitudinally extending slots 51. The locking ring intermediate cylindrical surface 77 is matingly received by the bonnet cylindrical end portion surface 61, and the locking ring inner cylindrical surface 79 makes an interference fit with the bonnet locking ring retainer surface 59. When the locking ring is installed, its flange portion 81 engages the bonnet outer extremity radially extending face surface 63. The installation is completed by the addition of the handle 27 and handle cap member 31.

In most cases, as in the embodiment herein shown and described, the parts that make up the "stack" of the valve control assembly 21 are made of molded plastic. These parts will have manufacturing tolerances, so that the overall length of the valve control assembly 21 will be variable in a random fashion. In order to make certain that a valve control assembly 21 will always be clamped by the bonnet 23 with the force required to assure proper seating of the valve control assembly inlet seals 91, the valve control assembly parts are dimensioned such that the installed assembly length between the valve body means bottom end wall 35 and the valve control assembly top bearing surface 47 will be at least equal to the length of the valve body member chamber side wall 33. Since the overall length of the valve control assembly 21 will be variable in a random fashion, so also the rotational position of the bonnet 23 upon assembly will be variable in a random fashion. In the preferred embodiment herein shown and described, the bonnet locking ring longitudinally extending protrusions 89 and the valve control assembly locking portion longitudinally extending slots 51 are in the form of ratchet type teeth; there are four bonnet locking ring protrusions 89, and the valve control assembly locking portion slots 51 cover the entire locking portion circumference. The number of bonnet locking ring protrusions 89 and their location on the bonnet locking ring inner peripheral surface 73, as well as the number and location of the valve control assembly locking portion slots 51, is a matter of design choice. There should be sufficient bonnet locking ring protrusions 89 to provide the desired structural integrity. The valve control assembly locking portion slots 51 must of course cover the locking portion circumference to an extent sufficient to accomodate the maximum variation of the bonnet rotational position upon assembly. The number, location and configuration of the bonnet locking ring rectangular protrusions 87 and the corresponding bonnet slots 65 is also a matter of design choice. The bonnet slots 65 must be made sufficiently wider than the corresponding bonnet locking ring rectangular protrusions 87 to assure that the bonnet locking ring inner peripheral protrusions 89 will always be engagable with the valve control assembly locking portion slots 51, regardless of the assembled rotational position of the bonnet 23 relative to the valve body member 17.

The bonnet locking ring outer peripheral rectangular depressions 85, when the bonnet locking ring 25 is assembled, will extend slightly beyond the bonnet outer extremity face surface 63, providing respective small rectangular openings that can receive a prying tool for freeing the bonnet locking ring 25 from its retained position. The bonnet locking ring 25 is preferably made of molded plastic material.

The foregoing disclosure and the showings made in the drawings are merely illustrative of the principles of this invention and are not to be interpreted in a limiting sense.

I claim:
1. In a faucet valve, the combination comprising:
   a. valve body means defining a chamber having a generally cylindrical side wall, a bottom end wall and an open top, with said valve body means having external threads adjacent said open top,
   b. an assembly of faucet valve parts disposed within said chamber, and having cylindrical exterior surfaces that are matingly received by said generally cylindrical side wall,
   c. a bonnet having internal threads engaging said valve body external threads for retaining said assembly within said chamber,
   d. bonnet locking means comprising:
      i. means for preventing rotational movement of said assembly of faucet valve parts relative to said valve body means, and
      ii. locking means interengaging said assembly of faucet valve parts and said bonnet for preventing rotational movement of said bonnet relative to said assembly of faucet valve parts and consequently preventing rotational movement of said bonnet relative to said valve body means when said faucet valve is assembled.
2. In a faucet valve, the combination comprising:
   a. valve body means defining a chamber having a generally cylindrical side wall, a bottom end wall and an open top, with said valve body means having external threads adjacent said open top,
   b. an assembly of faucet valve parts disposed within said chamber and having a top bearing surface, with the manufacturing tolerances of said assembly being such that the installed assembly length between said bottom end wall and said top bearing surface will always be at least equal to the length of said chamber side wall,
   c. a bonnet having internal threads engaging said valve body external threads and having an internal flange portion having a bearing surface adapted for engagement with said top bearing surface to retain said assembly within said chamber,
   d. bonnet locking means comprising:
      i. means for preventing rotational movement of said assembly of faucet valve parts relative to said valve body means, and
      ii. locking means interengaging said assembly of faucet valve parts and said bonnet for preventing rotational movement of said bonnet relative to said assembly of faucet valve parts and consequently preventing rotational movement of said bonnet relative to said valve body means when faucet valve is assembled.
3. The device of claim 2 wherein said means interengaging said assembly of faucet valve parts and said bonnet is a locking ring having radially outer and inner peripheral surfaces, with at least a portion of said outer peripheral surface engaging said bonnet and at least a portion of said inner peripheral surface engaging said assembly of faucet valve parts.
4. The device of claim 2 wherein:
   a. said assembly of faucet valve parts has a generally cylindrical locking portion having a diameter less than that of said cylindrical exterior surfaces and extending outwardly beyond said assembly top bearing surface, with the peripheral surface of said locking portion having longitudinally extending slots,
   b. said bonnet internal flange portion is provided a slot,
   c. said means interengaging said assembly of faucet valve parts and said bonnet is a locking ring having radially outer and inner peripheral surfaces, with a portion of said outer peripheral surface forming a rectangular protrusion that is received by said bonnet slot, and with at least a portion of said inner peripheral surface forming a plurality of protrusions that are matingly received by longitudinally extending slots of said assembly locking portion, d. said bonnet slot being sufficiently wider than said locking ring rectangular protrusion that said locking ring protrusions are always engageable with said assembly locking portion longitudinally extending slots regardless of the assembled rotational position of said bonnet relative to said valve body means.

5. The device of claim 4 wherein said locking ring protrusions and said assembly locking portion longitudinally extending slots are ratchet type teeth.

* * * * *